United States Patent Office 2,861,994
Patented Nov. 25, 1958

2,861,994
PREPARATION OF 2,5-DIMETHYLPIPERAZINE

William Perkins Coker and Greene Wallace Strother, Jr., Lake Jackson, Tex., assignors to The Dow Chemical Company, Midland, Mich., a corporation of Delaware No Drawing. Application February 23, 1956
Serial No. 567,059

5 Claims. (Cl. 260—268)

This invention relates to a method for the preparation of 2,5-dimethylpiperazine from 2-aminopropanol-1.

Various methods are known and may be employed for the preparation of alkylpiperazines including, by way of illustration, the reduction of alkylpyrazines and alkylpyrazine derivatives; the reduction of certain lactamides; and by the condensation of alkanolamines such as isopropanolamine. The methods which are available for the preparation of alkylpiperazines from alkanolamines, however, are generally better adapted for utilization with alkanolamines in which the hydroxyl group has a secondary attachment. It would be advantageous for a method to be available for the efficient manufacture of alkylpiperazines from alkanolamines containing a hydroxyl group having a primary attachment wherein substantial yields of such products could be obtained from particular varieties of such relatively simple and readily available raw materials. Such a method would not only circumvent processes which require more complex compounds as raw materials but could be beneficially applied for the preparation of 2,5-dimethylpiperazine, from 2-aminopropanol-1.

It is among the principal objects of the present invention to provide a method for the preparation of 2,5-dimethylpiperazine directly from 2 - aminopropanol - 1. This object, and other objects and advantages, may be achieved by practice of the method of the present invention which comprises subjecting 2-aminopropanol-1 to a Raney nickel catalyst mass while it is maintained, in the presence of hydrogen, under a pressure between about 750 and 2,000 pounds per square inch at a temperature between about 140 and 220° C. until substantial portions of the 2-aminopropanol-1 are converted to 2,5-dimethylpiperazine.

The reaction which occurs may be represented by the following equation:

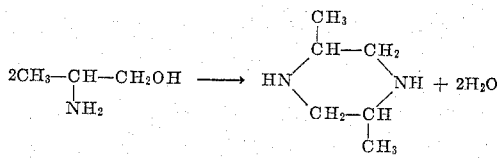

Theoretically, 2 moles of the 2-aminopropanol-1 are required to be cyclized to produce each mole of the product 2,5-dimethylpiperazine which is obtained as a mixture of its cis and trans isomers. 2,5-dimethylpiperazine may be obtained in good yield with high conversion of the 2-aminopropanol-1 according to the method of the invention. Frequently, conversions of the 2-aminopropanol-1 to 2,5-dimethylpiperazine which are in the neighborhood of 50 percent and higher may be experienced when the reaction is continued for a period of about 4 to 8 hours.

Advantageously, a pressure in the neighborhood of about 1,000 pounds per square inch and a temperature of about 150° C. may be employed. Higher operating temperatures tend to favor formation of the cis isomer. Greater relative proportions of the frequently more desirable trans isomer can be obtained in the 2,5-dimethylpiperazine product when the reaction is conducted at a temperature which is not substantially in excess of about 150° C. In many instances as much as 75 percent and more of the product may be obtained as the trans isomer in this manner. While temperatures and pressures which are lower than those set forth may be operative, they are usually undesirable in that they require excessively long periods of time in order to accomplish the reaction.

It is preferable to conduct the reaction in an atmosphere which contains a relatively large quantity of hydrogen in proportion to the amount of 2-aminopropanol-1 which is present, although a hydrogen atmosphere in which as little as about 0.5 mole of hydrogen is present for each mole of the 2-aminopropanol-1 may be suitably employed. An amount of Raney nickel catalyst between about 5 and 20 percent by weight, based on the weight of the 2-aminopropanol-1 being converted, may be advantageously utilized.

The 2,5-dimethylpiperazine product may be recovered from the reaction mass according to various techniques which are apparent to those skilled in the art. For example, solvent extraction, filtration, distillation and crystallization procedures may be employed in any desired or necessary manner in order to obtain the product in a suitably pure condition.

The following examples further illustrate the invention although it is not to be considered as being limited to or restricted thereby.

Example 1

About 300 grams of 2-aminopropanol-1 was charged into a conventional stainless steel rocking autoclave to which was added about 25 grams of Raney nickel. The charged and sealed apparatus was pressurized with about 1,000 pounds per square inch (gauge) of hydrogen. The temperature of the reaction mass was raised to a temperature of about 170° C. and maintained in the neighborhood thereof while the apparatus was rocked for an eight hour period. At the end of this period, the autoclave was cooled and the pressure released. About 180 grams total of the crude 2,5-dimethylpiperazine product was recovered which consisted of about 72 percent by weight of the trans isomer, as determined by melting point and recrystallization of the trans-2,5-dimethylpiperazine from a solution of the entire 2,5-dimethylpiperazine product in dry acetone. The yield of the cis-trans-2,5-dimethylpiperazine product which was obtained, having a melting point of about 110° C. and an atmospheric boiling point of about 160° C. was about 53 percent, based on a 65 percent conversion of the 2-aminopropanol-1.

Example 2

About 142.3 grams (150 milliliters) of 2-amino-propanol and 30 grams of Raney nickel in lump form was charged to a stainless steel rocking autoclave having a bomb capacity of about 1400 cubic centimeters. The ingredients, under a hydrogen pressure of about 900 pounds per square inch (gauge), were reacted for about an eight hour period at a temperature of about 170° C. At the termination of the reaction period, the reactor was cooled and the pressure released. The reaction mass was filtered to remove catalyst and was then distilled to remove water. The unreacted 2-aminopropanol-1 and the crude 2,5-dimethylpiperazine product were flashed off of the reaction mass at a temperature between about 60 and 80° C. under a pressure of about 20 millimeters of mercury. About 0.86 mole of the mixed 2,5-dimethylpiperazine isomers were found to have been obtained in the reaction, representing an overall conversion of about 64.5 percent. A yield of about 73.3 percent of trans-2,5-dimethylpiperazine was obtained from the 2,5-dimethylpiperazine product by recrystallization from acetone.

What is claimed is:

1. Method which comprises subjecting 2-aminopropanol-1 to a Raney nickel catalyst mass while it is maintained, in the presence of hydrogen, under a pressure between about 750 and 2,000 pounds per square inch at a temperature between about 140° C. and 220° C. to convert substantial portions of the 2-aminopropanol-1 to 2,5-dimethylpiperazine.

2. Method which comprises subjecting 2-aminopropanol-1 to a Raney nickel catalyst mass while it is maintained, in the presence of hydrogen, under a pressure between about 750 and 2,000 pounds per square inch at a temperature between about 140° C. and 220° C. for a period of time of about 4 to 8 hours to convert substantial portions of the 2-aminopropanol-1 to 2,5-dimethylpiperazine.

3. The method of claim 2 wherein the temperature is not substantially in excess of about 150° C.

4. The method of claim 2 wherein the pressure is in the neighborhood of 1,000 pounds per square inch.

5. The method of claim 2 wherein an amount of Raney nickel catalyst is employed which is between about 5 and 20 percent by weight, based on the weight of the 2-aminopropanol-1.

References Cited in the file of this patent

UNITED STATES PATENTS

| | | |
|---|---|---|
| 2,400,022 | Pollard et al. | May 7, 1946 |
| 2,479,657 | Wilkes | Aug. 23, 1949 |

OTHER REFERENCES

McElvain et al.: J. Am. Chem. Soc., vol. 76, pp. 1126–37 (1954).

J. Am. Chem. Soc. (1) 61, 532 (1939); (2) 58, 2487 (1936); (3) 60, 1033 (1938).